Dec. 2, 1941.  A. B. SABIN  2,265,046
THICKENER
Filed June 20, 1938  3 Sheets-Sheet 1
FIG_1_
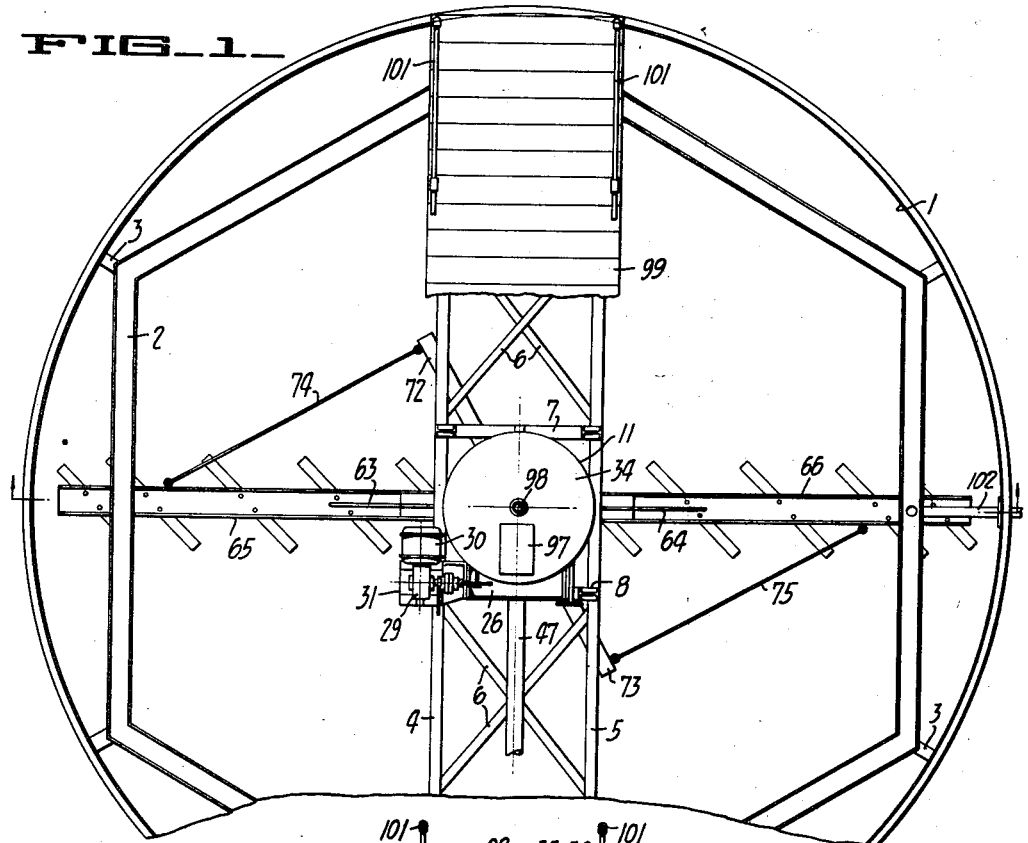
FIG_2_
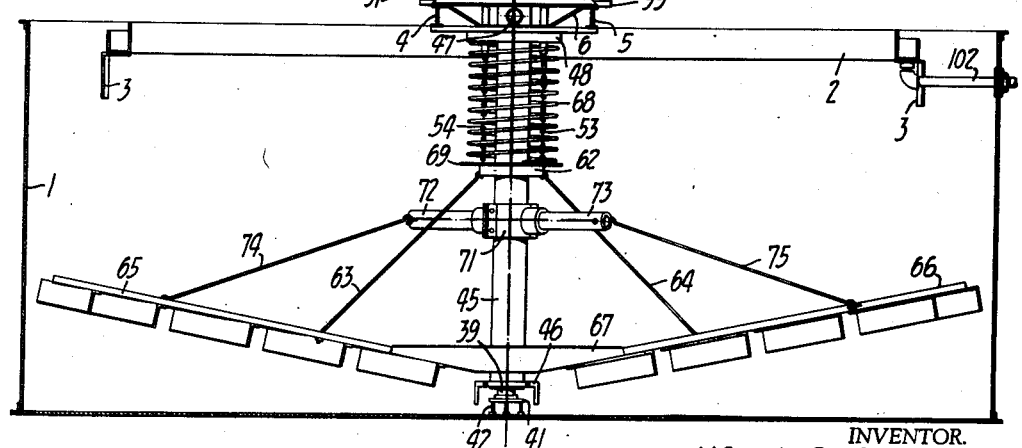
INVENTOR.
Alfred B. Sabin
BY
ATTORNEY.

Dec. 2, 1941.  A. B. SABIN  2,265,046
THICKENER
Filed June 20, 1938  3 Sheets-Sheet 2
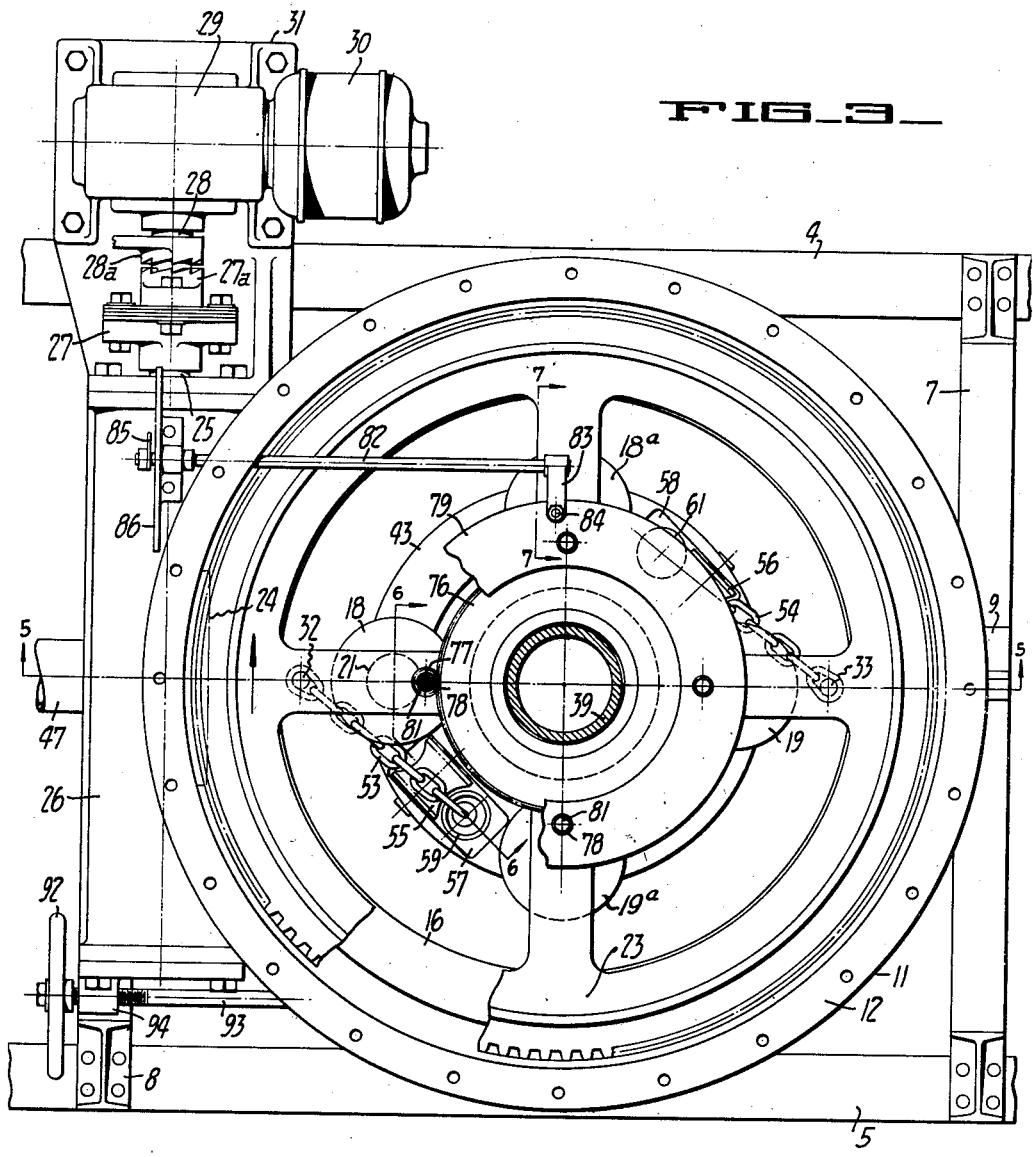
FIG_3_
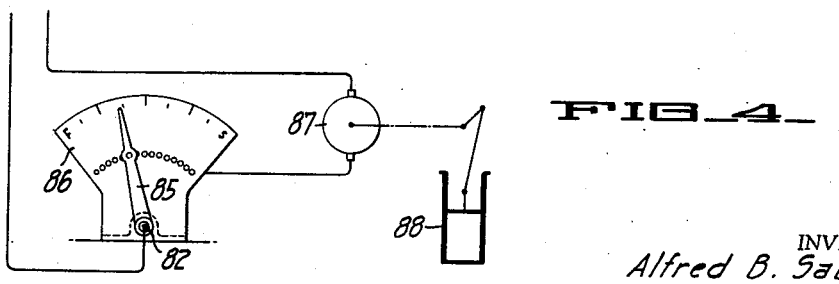
FIG_4_
INVENTOR.
Alfred B. Sabin
BY
ATTORNEY.

Dec. 2, 1941.   A. B. SABIN   2,265,046
THICKENER
Filed June 20, 1938   3 Sheets-Sheet 3
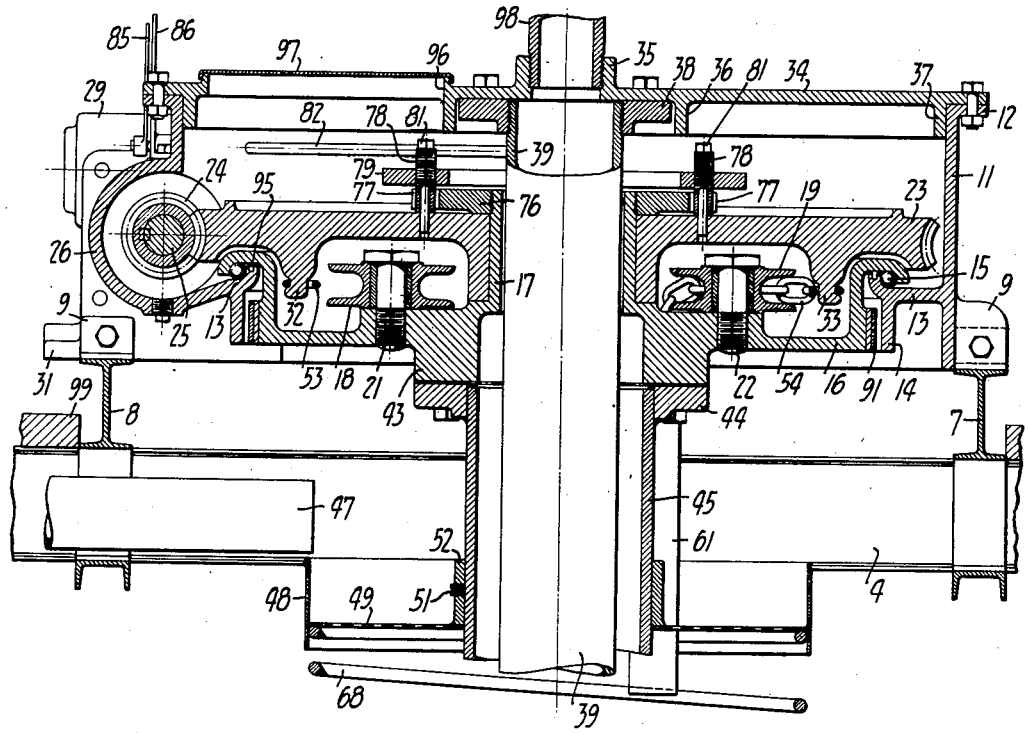
FIG_5_
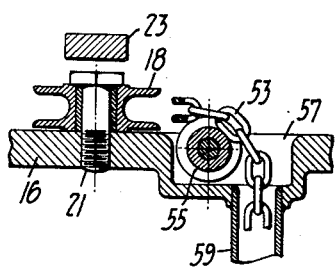
FIG_6_
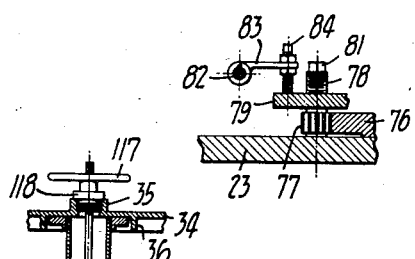
FIG_7_
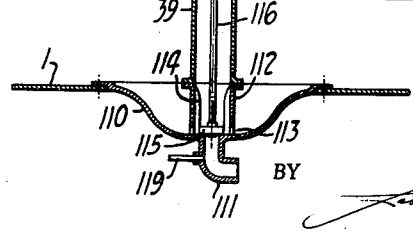
FIG_8_
INVENTOR.
Alfred B. Sabin
BY
ATTORNEY.

Patented Dec. 2, 1941

2,265,046

UNITED STATES PATENT OFFICE 2,265,046

THICKENER

Alfred Buell Sabin, Oakland, Calif.

Application June 20, 1938, Serial No. 214,851

7 Claims. (Cl. 210—55)

This invention relates in general to thickeners of the type wherein sludge to be thickened is fed to a tank provided at its bottom with a set of rakes by means of which the settled solids are moved to the center of the tank and from there conveyed away.

In thickeners of this type the sludge settling to the bottom of the tank oftentimes becomes so thick that it causes the mechanism to be overloaded, and therefore some means must be provided either to trip a switch in the circuit of the motor operating the rakes or to lift the rakes to a zone in which the sludge is less dense. It sometimes happens that solid matter is introduced with the sludge which forms an obstruction to the rotation of the rakes and here again means must be provided for either stopping the motor or lifting the rakes. It is preferable to raise the rakes from the sludge rather than to stop the motor and leave the rakes submerged in the thick sludge, for once the rakes have stopped rotating and are left submerged in the dense sludge, it is only with considerable difficulty that they can be raised. Furthermore, it is the usual practice to eliminate the thickened sludge settling to the bottom of the tank downwardly through an external valve associated with the bottom of the tank. This necessitates that either the tank be supported on timbers or a suitable tunnel be provided so that access may be had to the thickened sludge outlet. Either construction is costly, for it is to be borne in mind that the tanks of these thickeners may exceed one hundred feet in diameter.

One of the objects of this invention is the provision of a thickener wherein the rakes may be lowered and raised in response to variations in the density of the sludge within the tank.

Another object of this invention is the provision of a thickener wherein the thickened sludge in the bottom of the tank may be conveyed away through an outlet extending through the bottom of the tank and provided with a valve operated from the top of the tank.

Another object of this invention is the provision of a thickener wherein the thickened sludge in the bottom of the tank may be conveyed upwardly from the central portion of the bottom of the tank by a pipe depending into the bottom of the tank, thereby eliminating the necessity of the costly tunnels or timbers ordinarily used.

Another object of the invention is the provision of a thickener wherein the rake assembly is supported by a central column which in turn is secured at each end against lateral movement.

Another object of the invention is the provision of a thickener wherein the level of the rakes is determined by the density of the sludge and wherein a visible gauge is provided showing the position of the rakes and thereby indicating the load on the thickener.

Another object of the invention is the provision in a thickener of an overload device in combination with means for operating a signal and cutting off the power.

A further object of the invention is the provision in a thickener of means for lifting its rakes when they have been locked against rotation.

Still another object of the invention is the provision of means for controlling the density of the slime discharge.

The invention possesses other advantageous features, some of which with the foregoing will be set forth at length in the following description where that form of the invention which has been selected for illustration in the drawings accompanying and forming a part of the present specification is outlined in full. In said drawings, one form of the invention is shown, but it is to be understood that it is not limited to such form, since the invention as set forth in the claims may be embodied in a plurality of forms.

Referring to the drawings:

Figure 1 is a top plan view of a thickener embodying the objects of my invention.

Figure 2 is a vertical mid-section of the thickener shown in Figure 1.

Figure 3 is an enlarged plan view of the rake-operating mechanism with the top of the mechanism removed in order more clearly to show its construction and operation. It is to be noted that the device as shown in this figure has been rotated in a counter-clockwise direction through an angle of 90° with respect to the position of the device as shown in Figure 1.

Figure 4 is a diagrammatic illustration of a slime pump attached to the center slime discharge outlet, and the operation of which may be controlled in relation to the level of the rakes within the thickener tank.

Figure 5 is a vertical section taken on the line 5—5 of Figure 3.

Figure 6 is a fragmentary vertical section taken on the line 6—6 of Figure 3.

Figure 7 is a fragmentary vertical section taken on the line 7—7 of Figure 3.

Figure 8 is a fragmentary vertical mid-section of a modification of the thickener shown in the figure above described.

As shown in Figure 1, the objects of my invention may be embodied in a thickener comprising a cylindrical tank 1 within which is secured at its upper edge a launder 2 of hexagonal form by brackets 3, or any other type of launder. Supported on the upper periphery of the tank 1 and secured thereto in any suitable manner is a pair of spaced parallel I beams 4 and 5 disposed on either side of a diameter of the tank. The I beams 4 and 5 are reinforced by trusses 6 and support cross members 7 and 8 which is shown may be I beams or any other suitable shapes. Seated on the cross members 7 and 8 and secured thereto by ears 9 is a ring 11, the upper periphery of which is provided with an outwardly extending flange 12. Formed integral with the ring 11 is an inwardly extending ball race 13 having a depending skirt 14. Rotatably supported on ball bearings 15 accommodated on the ball race 13 is a turntable or pan 16 provided with an upwardly extending central collar 17. The pan 16 carries two sets of diametrically opposed pulleys 18 and 19 and 18a and 19a, the pulleys 18 and 19 being journaled on pins 21 and 22 threaded in the base of said pan, and the pulleys 18a and 19a being similarly carried by pins not shown. Journaled about the collar 17 is a worm wheel 23 adapted to be driven by a worm gear 24 keyed to a shaft 25. The shaft 25 extends through a housing 26 formed integral with the ring 11 and is connected with one end of flexible coupling 27. The other end of the coupling 27 is secured to a shaft 28 driven through a speed reducer 29 by an electric motor 30. Journaled about the shaft 28 is a hand operated clutch 28a, arranged for engagement with a complementary clutch member 27a carried by the coupling 27. The motor 30 and its associated speed reducer 29 are supported on a bracket 31 secured in any desired manner to the ring 11. Depending from and formed integral with the worm wheel 23 is a pair of diametrically opposed lugs 32 and 33, the lower ends of which are co-planar with a plane passing through the pulleys 18 and 19 and 18a and 19a.

Bolted to the flange 12 of the ring 11 is a cap 34 provided with an upwardly extending threaded flange 35 and with downwardly extending circular flanges 36 and 37. Accommodated within the downwardly extending circular flange 36 and bolted to the cap 34 is an inwardly threaded fitting 38 to which is secured a pipe 39 extending downwardly through the collar 17 and terminating in a foot 41 adjacent the bottom of the tank 1, as best shown in Figure 2. The foot 41 is provided with a number of spacers 42 for maintaining the lower end of the pipe 39 in spaced relation with the bottom of the tank, thereby permitting the egress of the thickened sludge from the bottom of the tank.

Bolted to a central hub 43 of the pan 16 is a ring 44 to which is welded a torque tube or sleeve 45, the lower end of which terminates at a point immediately above the foot 41 of the pipe 39 and is provided with a wiper mechanism 46 for maintaining the zone immediately adjacent the lower end of the pipe 39 free and clear of any obstructions.

Extending over the upper edge of the tank 1 intermediate the I beams 4 and 5 is a slime feed pipe 47, the inner end of which terminates immediately above a distributor ring 48 provided with a perforated bottom 49 and which is secured to the sleeve 45 by a set screw 51 passing through an upwardly extending sleeve 52.

Secured to each of the lugs 32 and 33 of the worm wheel 23 are chains 53 and 54 which respectively pass over the pulleys 18 and 19 and then over pulleys 55 and 56 journaled within recesses 57 and 58 formed in the hub 43 of the pan 16. The chains 53 and 54 then pass through pipes 59 and 61 respectively secured within openings formed in the bottoms of the recesses 57 and 58, and are secured at their lower ends to a ring 62 journaled about the tubular sleeve 45.

Suspended from the ring 62 by rods 63 and 64 are rakes 65 and 66, the inner ends of which are secured to a yoke 67 journaled on the sleeve 45. Surrounding the sleeve 45 is a spring 68, the upper end of which is accommodated within a portion of the ring 48 extending beneath the perforated bottom 49, while its lower end is supported on a plate 69 secured to the ring 62. Clamped to the sleeve 45 is a collar 71 to which are threaded radially extending arms 72 and 73. To the outer ends of the arms 72 and 73 are secured rods 74 and 75, the lower ends of which are connected to the rakes 65 and 66.

Threaded to the upper end of the collar 17 is a ring gear 76 adapted to mesh with four pinions 77, equally spaced about its periphery. Each of the pinions is secured to a sleeve 78 in threaded engagement with a ring 79, and each of the threaded sleeves 78 is mounted for rotation on a pin 81 secured to the ring gear 23. Passing through the ring 11 at a point above the housing 26 (Figures 3 and 5) is a rod 82, to the inner end of which is secured a lever 83 carrying a set screw 84 adapted to engage the ring 79 (Figure 7). The outer end of the rod 82 carries a pointer 85 adapted to move over a graduated scale 86 secured to the housing 26.

As diagrammatically shown in Figure 4, the pointer 85 and scale 86 may be constructed in the form of a rheostat for controlling the power input to a motor 87 which in turn operates a slime pump 88 by which slime is removed from the tank 1.

Surrounding the periphery of the pan 16 is a brake band 91 operated in any suitable manner by a hand wheel 92 carried by a rod 93 threaded to a bracket 94 secured to one end of the housing 26. Although not shown in the drawings, one end of the brake band is made fast while the other end is secured directly or indirectly to the inner end of the rod 93 so that upon rotation of the hand wheel 92, pressure may be applied as desired by the brake band 91 on the brake shoe formed by the periphery of the pan 16.

A seal between the ball race 13 and the pan 16 may be made by a packing 95 so that the oil used to lubricate the movable members enclosed within the chamber formed by the ring 11 and the pan 16 may be prevented from reaching the bearings. Formed in the cap 34 is a man hole 96 provided with a cover plate 97. Threaded to the flange 35 is a sludge discharge pipe 98. Supported on the I beams 4 and 5 is a board walk 99 which in accord with the usual practice is provided with guide rails 101. Passing through the upper edge of the tank 1 is an overflow discharge pipe 102 communicating at its inner end with the bottom of the launder 2.

The device as above constructed operates as follows:

Slime is fed to the tank 1 by gravity or by a pump through the slime feed pipe 47 and the distributor ring 48. When the slime has reached the desired level in the tank 1, the electric motor 30 is put into operation and through the speed reducer 29, flexible coupling, and the worm gear 24, rotates the worm wheel 23. The worm wheel 23 rotates about the collar 17, thereby placing the chains 53 and 54 carried by the lugs 32 and 33, under tension. Since the weight of the rakes 65 and 66 is carried by the chains 53 and 54, the rotary movement of the worm wheel 23 will be imparted through the pulleys 18 and 19 to the pan 16 and consequently the rakes, the sleeve 45, the pan 16, and the worm wheel 23 will rotate as a unit. If, however, the density of the sludge within the zone in which the rakes 65 and 66 are operating is above a predetermined value, the rotary motion of the rakes will be resisted and as a consequence the pan 16 to which the pulleys 18 and 19 are secured, will be held against rotation and there will be relative rotary motion between the pan 16 and the worm wheel 23. This relative motion between the pan 16 and the worm wheel 23 will cause the chains 53 and 54 to move upwardly over the pulleys 55 and 56, thereby bodily lifting the rakes against the action of the spring 68 and gravity. The action of the spring 68 is obviously the equivalent of weighting the rakes and in some instances it might be desirable not only to eliminate the spring but even to buoy the rakes. It is to be noted, however, that the spring produces a variable load whereas gravity produces a constant load. The higher the rakes are lifted, the greater will be the compression on the spring 68, tending to force the ring 62 downwardly. The density of the slime within the tank 1 increases with depth, and therefore normally a zone will be reached during the upward movement of the rakes at which the density of the slime is insufficient to further retard the rotation of the rakes and at this point the rakes, the sleeve 45, the pan 16, and the worm wheel 23 will again rotate as a unit. Conversely, if the density of the sludge in which the rakes are operating is insufficient to maintain this balance, the weight of the rakes reinforced by the action of the spring 68, will force the rakes downwardly into a lower zone and in so doing there will again be relative rotary motion between the pan 16 and the worm wheel 23, until a balance is again struck. Obviously, any solid obstruction within the zone in which the rakes are operating and which is sufficient to retard or stop their rotary motion will cause the rakes to rise in the same manner as a slime of excessive density.

Due to the fact that the ring gear 76 is secured to and rotates with the pan 16, and that the pinions 77 are carried by the worm wheel 23, any relative rotary motion between the pan 16 and the worm wheel 23 which as above explained causes a vertical movement of the rakes, will cause the pinions 77 to rotate, and thereby, due to the threaded engagement of the sleeves 78 with the ring 79, will cause the ring 79 to rise or fall. The vertical movement of the ring 79, as best shown in Figure 7, will cause the rod 82 to rotate, thereby producing a movement of the pointer 85 over the scale 86. The position of the pointer 85 on the scale 86 can therefore be made to indicate the level of the rakes and the density of the sludge in which they are operating. Furthermore, if as shown in Figure 4 the pointer 85 and the scale 86 are made in the form of a rheostat to control the feed pump 88 through the operation of the motor 87 or to control the slime discharge of tank 1, it is apparent that the rise and fall of the rakes may be made to maintain automatically a substantially constant slime density within the zone in which the rakes are operating.

The rakes 65 and 66 operate in a normal manner to move the thickened sludge in the bottom of the tank to the center thereof, from whence it is discharged upwardly through the pipe 39 and the pipe 98 to a further stage in the process, such as filtration. The supernatent liquor overflows the lower lip of the launder 2 and passes through the overflow discharge pipe 102 to any subsequent step in the process. By discharging the thickened sludge upwardly through the pipe 39 instead of through a pipe extending downwardly through the bottom of the tank, I have made it possible to support the tank directly on the ground without the usual requirement of either providing costly tunnels or supporting the tank on timbers so that there may be access to the sludge discharge pipe extending downwardly through the bottom of the tank as ordinarily used. Bearing in mind that thickeners of this type may exceed one hundred feet in diameter, the elimination of such tunnels or timbering is a decided advantage.

It is to be particularly noted that the weight of the rakes 65 and 66 is carried by the chains 53 and 54 through the ring 62 and that the torque developed in rotating the rakes is carried through the arms 72 and 73 by the sleeve 45.

If it is for any reason desired to lift the rakes 65 and 66, an artificial torque may be placed on the pan 16 by the brake band 91 so as to hold the pan against rotation, whereupon rotation of the worm wheel 23 will cause the rakes to be lifted as above described. Although the worm wheel 23 is normally driven by the motor 30, it may be rotated by hand simply by engaging the hand clutch 28a with the complementary clutch member 27a carried by the coupling 27.

Although as herein described and illustrated in the drawings, the rakes are moved bodily in response to any relative rotation between the pan 16 and the worm wheel 23, the rakes 65 and 66 may if desired be hinged to the yoke 67 with the result that relative motion between the pan 16 and the worm wheel 23 will cause only the outer ends of the rakes to move vertically. Obviously, cables may be substituted for the chains 53 and 54, and in the following claims the term "chain" shall be deemed to include a cable or other equivalent device. Likewise the function of the pulleys 18, 18a, 19, and 19a may be performed by a single grooved ring rotatably mounted on the turntable or pan 16 and provided with suitable notches for the downward passage of the chains 53 and 54.

In Figure 8, the tank 1 is provided with a central sludge sump 110 provided with a downwardly extending sludge outlet 111 and an upwardly extending flanged fitting 112, adapted to be secured to the pipe 39. The fitting 112 is formed with openings 113 for establishing communication between the sump and the interior of the fitting and with interior ribs 114 to which is slidably keyed a valve 115. The valve 115 is carried by the lower end of a small pipe 116 extending upwardly through the pipe 39 and which may be conveniently used for the introduction of water or air for cleaning the valve and sludge outlet. To the upper end of the pipe 116 is threaded a hand wheel 117 supported on a plug 118 screwed in the flange 35. As a result of this construction, it will be seen that the valve 115 may be operated from the top of the tank by simply turning the hand wheel 117, and that although the thickened sludge is discharged through the bottom of the tank again, no tunnels or supporting timbers are required, for the valve is accessible from within the tank. If it is not desired to use the pipe 111 for introducing cleaning fluid to the valve and sludge outlet, a separate pipe 118 may be used for this purpose.

The alternative construction for discharging the thickened sludge through the bottom of the thickener as shown in Figure 8 does not necessitate any change whatsoever in the remaining portions of the thickener as shown in Figures 1 to 7, inclusive.

I claim:

1. A thickener comprising: a tank; a tube mounted in said tank for rotary movement about a vertical axis; pulleys secured to the upper portion of said tube; a driven member mounted in said tank for rotation about the upper portion of said tube; chains secured to said driven member and arranged to pass over said pulleys and downwardly along said tube; and a rake suspended from said chains and arranged for rotary movement about the axis of said tube and for vertical movement along said tube.

2. A thickener comprising: a tank; a column mounted vertically within said tank; a vertical frame circumscribing and free to rotate about said column; pulleys fixed to the upper portion of said vertical frame; a driven member mounted within said tank adjacent said pulleys and free to rotate about said vertical frame; chains secured to said driven member and arranged to pass over said pulleys and downwardly along said tube; and a rake supported from said chains.

3. A thickener comprising: a tank; a vertical tube rotatably supported within said tank; a set of horizontally disposed pulleys and a set of vertically disposed pulleys carried by said tube; a gear supported by said tube above said pulleys and free to rotate with respect thereto; chains passing over said pulleys and secured at their upper ends to said gear; rakes supported from said chains; means for transmitting rotary movement of said tube to said rakes; and means for driving said gear.

4. A thickener comprising: a tank; a vertical tube rotatably supported within said tank; a set of horizontally disposed pulleys and a set of vertically disposed pulleys carried by said tube; a gear supported by said tube above said pulleys and free to rotate with respect thereto; chains passing over said pulleys and secured at their upper ends to said gear; rakes supported from said chains; means for transmitting rotary movement of said tube to said rakes; means for driving said gear; a ring gear secured to said tube; spaced pinions mounted on said gear arranged to mesh with said ring gear; screws mounted on said pinions for rotation therewith; a ring concentric with said tube and in threaded engagement with said screws; and means responsive to the vertical travel of said ring gear for indicating the level of said rakes.

5. A thickener comprising: a tank provided along its bottom with a sump; a slime discharge pipe external to said tank and communicating with said sump; a rake assembly including radially disposed rakes rotatably mounted within said tank; a conduit extending along the vertical axis of said rakes with its lower end in registration with said pipe and in open communication with said sump; a valve for cutting off communication between said sump and said pipe; and means extending through said conduit for operating said valve from the top of said thickener.

6. A thickener comprising: a tank provided along its bottom with a sump; a slime discharge pipe external to said tank and communicating with said sump; a rake assembly including radially disposed rakes rotatably mounted within said tank; a conduit extending along the vertical axis of said rakes with its lower end in registration with said pipe and in open communication with said sump; a valve for cutting off communication between said sump and said pipe; and a pipe extending through said conduit for operating said valve from the top of said thickener and for introducing a cleaning fluid to said valve.

7. A thickener comprising: a tank; a driven gear arranged for rotation within said tank about a vertical axis; a member concentric with said gear and arranged for relative rotation with respect thereto; pulleys fixed to said member; chains secured to said driven gear and arranged to pass downwardly over said pulleys; a rake supported from said chains; a scale associated with said thickener and having no relative movement with respect thereto; a pointer arranged to sweep over said scale; and means responsive to relative rotation between said gear and said member for actuating said pointer.

ALFRED BUELL SABIN.